(12) United States Patent
Ubertini et al.

(10) Patent No.: US 12,537,987 B2
(45) Date of Patent: Jan. 27, 2026

(54) METHOD, DEVICE, SYSTEM, PROGRAM FOR COMPUTER AND MEDIUM FOR PROGRAM FOR GENERATING A STREAMING LINEAR CHANNEL (STREAMING LINEAR CHANNEL)

(71) Applicant: SKY ITALIA S.r.l., Milan (IT)

(72) Inventors: Gabriele Ubertini, Milan (IT); Davide Gandino, Milan (IT)

(73) Assignee: SKY ITALIA S.r.l., Milan (IT)

( * ) Notice: Subject to any disclaimer, the term of this patent is extended or adjusted under 35 U.S.C. 154(b) by 0 days.

(21) Appl. No.: 17/630,486

(22) PCT Filed: Jul. 29, 2020

(86) PCT No.: PCT/IB2020/057139
§ 371 (c)(1),
(2) Date: Jan. 26, 2022

(87) PCT Pub. No.: WO2021/019453
PCT Pub. Date: Feb. 4, 2021

(65) Prior Publication Data
US 2022/0279229 A1    Sep. 1, 2022

(30) Foreign Application Priority Data

Jul. 29, 2019   (IT) .................... 102019000013227

(51) Int. Cl.
*H04N 21/262*     (2011.01)
*H04N 21/234*     (2011.01)
*H04N 21/845*     (2011.01)

(52) U.S. Cl.
CPC . *H04N 21/26258* (2013.01); *H04N 21/23424* (2013.01); *H04N 21/8456* (2013.01)

(58) Field of Classification Search
None
See application file for complete search history.

(56) References Cited

U.S. PATENT DOCUMENTS 10,694,238 B1 *   6/2020   Khurana ............ H04N 21/2358
2003/0154477 A1 *   8/2003   Hassell ................ G11B 27/329
                                                                          725/39

(Continued)

OTHER PUBLICATIONS

International Search Report and Written Opinion for International Application No. PCT/IB2020/057139, mailed Nov. 2, 2020.

(Continued)

*Primary Examiner* — Alexander Q Huerta
(74) *Attorney, Agent, or Firm* — Wolf, Greenfield & Sacks, P.C.

(57) ABSTRACT

A method is disclosed that generates a streaming linear channel reproduction list, the list a including a first streaming linear channel segment identifier and a second streaming linear channel segment identifier each identifying, respectively, a first and a second audiovisual streaming linear channel segment and obtained on the basis of, respectively, a first content segment identifier and a second content segment identifier and in which the streaming linear channel reproduction list specifies that the second streaming linear channel segment is to be reproduced in succession immediately after the first streaming linear channel segment.

15 Claims, 9 Drawing Sheets

(56) References Cited

U.S. PATENT DOCUMENTS

| | | | |
|---|---|---|---|
| 2014/0365491 A1 | 12/2014 | Macaulay et al. | |
| 2015/0074242 A1* | 3/2015 | Yamagishi | H04N 21/44209 709/219 |
| 2015/0095461 A1* | 4/2015 | McGowan | H04N 21/4302 709/219 |
| 2015/0249869 A1* | 9/2015 | Dhruv | H04N 21/23424 725/32 |
| 2016/0173961 A1* | 6/2016 | Coan | H04N 21/8456 725/32 |
| 2016/0345074 A1* | 11/2016 | Serbest | H04L 65/65 |
| 2018/0234714 A1* | 8/2018 | Johns | G06F 16/172 |
| 2019/0132630 A1* | 5/2019 | Loheide | H04N 21/23439 |
| 2019/0146951 A1* | 5/2019 | Velmurugan | H04L 67/02 707/822 |
| 2022/0038754 A1* | 2/2022 | Lipczynski | H04N 21/2407 |

OTHER PUBLICATIONS

Pantos et al., HTTP Live Streaming, Independent Submission. Aug. 2017:1-60.

* cited by examiner

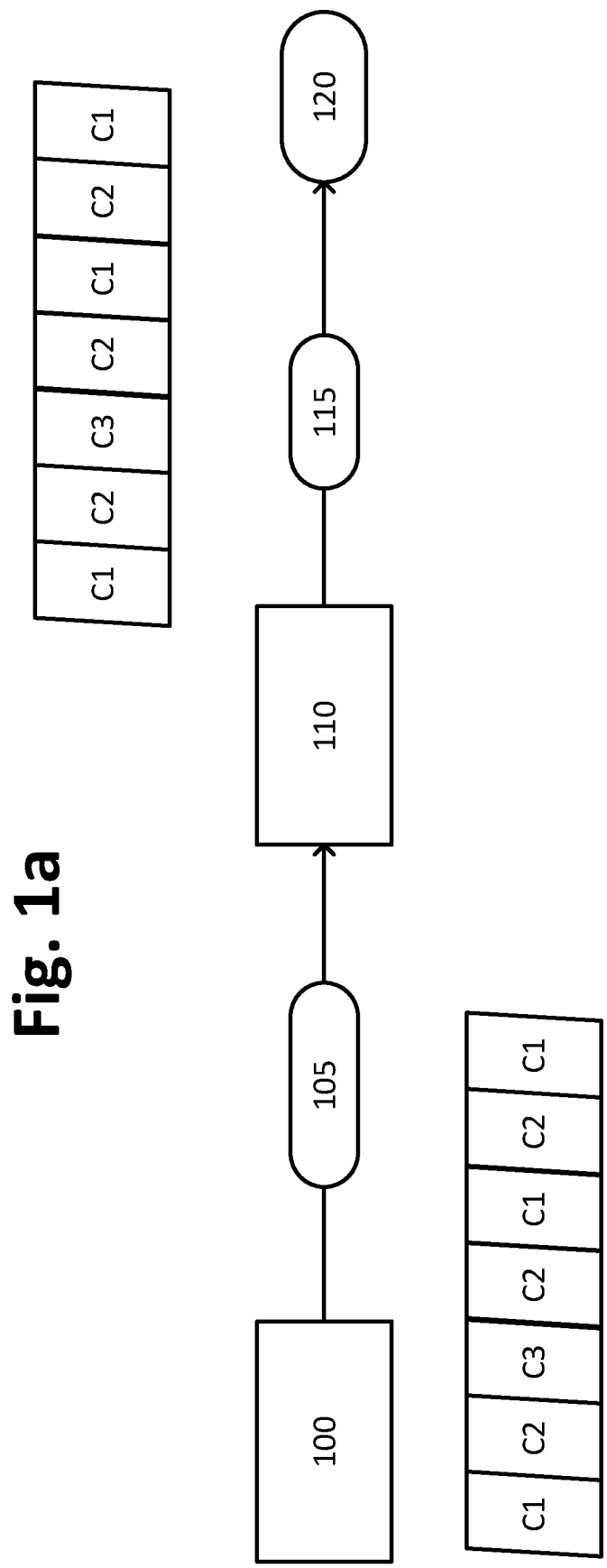

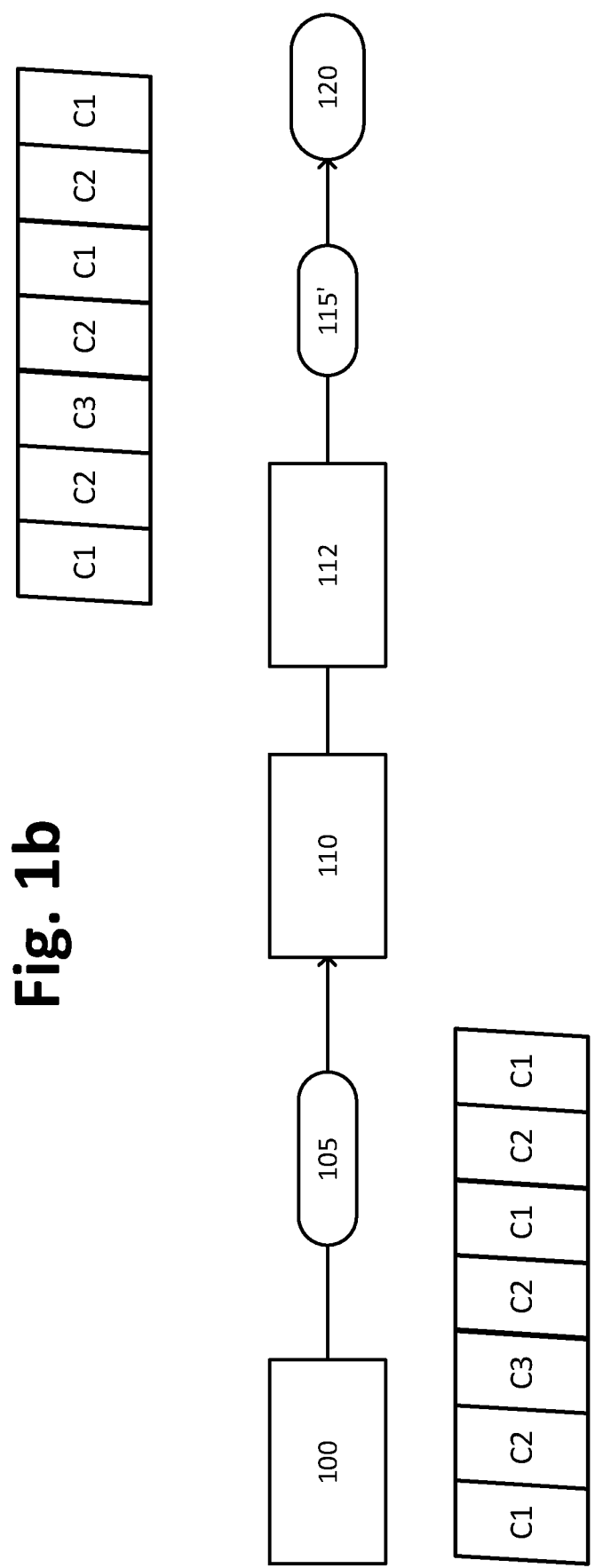

METHOD, DEVICE, SYSTEM, PROGRAM FOR COMPUTER AND MEDIUM FOR PROGRAM FOR GENERATING A STREAMING LINEAR CHANNEL (STREAMING LINEAR CHANNEL)

CROSS REFERENCE TO RELATED APPLICATIONS

This application is a national stage filing under 35 U.S.C. § 371 of International Patent Application Serial No. PCT/IB2020/057139, filed Jul. 29, 2020, which claims priority to Italian application number 102019000013227, filed Jul. 29, 2019. The contents of these applications are incorporated herein by reference in their entirety.

FIELD OF THE INVENTION

The present invention refers to the composition of streaming linear channels, or OTT linear channels.

BACKGROUND OF THE INVENTION

A linear channel is typically represented by a continuous MPEG stream, also in the presence of different audiovisual content units that follow one another according to the composition of the linear channel. In detail, if on the linear channel a content unit is being transmitted represented by the television program Pi, all the frames of the program Pi will be identified in succession (Fi . . . $F_{i+Ni}$, hypothesizing that Fi is the first frame of the program Pi and where Ni constitutes the total number of frames of the program Pi). If the scheduling program provides the transmission of another program Pill following the program Pi, all the frames following the Pill program will be concatenated subsequently and with continuity with respect to the program Pi (Fi+ni+1 . . . $F_i+n_i+n_{i+1}$, in which Ni+1 constitutes the total number of frames of the program Pi+1). In this manner, the user side decoder (for example a terrestrial or satellite receiver or top box set) is able to receive and decode the linear channel, independently of the number of television programs transmitted and of how they are composed. The broadcasting system selects the various sources from which to recover the single content units necessary for composing the programs and organize the single content units so that they are inserted into a continuous and seamless flow. This is illustrated in detail in FIG. 1a, wherein it is seen that a single non-compressed flow 105 of different contents is output from the playout 100; the continuous flow 105 is thus subjected to an encoder 110. The frame flow Fi discussed above can be the flow 105 emitted by the playout 100 after the composition, and delivered to the encoder 110 that outputs encoded frames 115 (in particular, compressed with a degree of compression according to the settings of the encoder) so as to obtain frames Fi'. These are then sent to the users.

When making an OTT linear channel the same approach is substantially followed, which can in fact be described with reference to FIG. 1b: firstly, (in the same manner as traditional linear channels) a continuous flow of frames Fi (105) is output from the playout 100; this flow 105 is then subjected to encoding 110, and further to an operation of segmentation by a segmenter 112 that generates segments, each comprising a certain number of frames. A list (also known as a manifest) is then generated in which the generated segments or at least a part of the segments is listed. These segments are then transmitted (115') by a suitable protocol to the users 220. The various segments on the list follow one another continuously, i.e. they are organized on the list (or numbered, etc.) so that the same segments are reproduced in succession when received from the user device. The continuity between the segments is preserved with the change of segment and also with the change of content as a result of the fact that all the segments result from a continuous flow of start frames Fi (105). To summarize, it can be said that the encoder, in addition to compressing the online content (i.e. in real time), breaks down the single continuous frame flow Fi into a list of segments to be reproduced subsequently on the decoder. What has been said is visible in FIGS. 1a and 1b, wherein different contents or start programs C1, C2 and C3 are illustrated (some of which can be repeated over time) to be set by playout 100; starting from the contents C1, C2, C3, the flow 105 is obtained first and then after encoding the flow 115 (DTT, satellite, etc.) or 115' (OTT) is obtained. When the frames or (in the case of OTT, the frames extracted from the) segments are reproduced on the user side 120, the same sequence of programs set on the playout 100 is reproduced. Accordingly, the destruction (or composition) line of a linear channel can be used both for a traditional linear channel (DTT, satellite, etc.) and for an OTT channel, wherein the only differences consist of the fact that—in the case of OTT—in addition to performing online encoding (in real time), the encoded frames are segmented and transmitted downstream with a streaming protocol. It is possible to combine the two transmission methods easily, as at the encoder output a linear flow 115 can be generated to be sent to the traditional channels (DTT, satellite, etc), and a segmented flow 115' to be sent in streaming mode. In the transmission (115') of these OTT linear channels, starting from the continuous frame flow, different protocols can be used such as for example HLS, DASH, etc.

SUMMARY OF THE INVENTION

The solution disclosed above for transmitting OTT linear channels is the solution adopted in the prior art for a series of technical reasons, such as for example the possibility and convenience of reusing most of the composition chain of the linear channel without modifications to the composition chain. Further, altering the distribution chain typically requires different technical approaches, which may involve the risk of compromising suitable transmission of the traditional linear channel (for example, the introduction of otherwise optimized latency in the chain, artefacts in the encoding due to possible alterations of the chain, etc.), a reason for which technicians are absolutely reluctant and against making changes to this chain. It is thus clear that the solution of FIG. 1b is rooted in the industry.

The inventors nevertheless recognized that it is possible to improve streaming linear channel composition systems, in particular by moving away from the conventional solutions and after recognizing that also the possible risks mentioned above are overcompensated by other simplifications that can be obtained in the composition of the streaming linear channel. One of the objects of the invention is thus to improve currently known systems for transmitting OTT linear channels. Some aspects of the invention are disclosed below:

according to one aspect A1, a method is provided for composing, preferably in a content supplying entity, a streaming linear channel to be transmitted on the basis of audiovisual segments to be reproduced in succession, the streaming linear channel comprising at least a first audiovisual content obtained from a first source (S1), and a second audiovisual content obtained from a second source (S2), the method comprising the steps of:

obtaining (S10) a first content segment identifier (SEG-$ID_{1,i}$) which identifies a first audiovisual segment ($SEG_{1,i}$) related to the first content (C1);

obtaining (S20) a second content segment identifier (SEG-$ID_{2,j}$) which identifies a second audiovisual segment ($SEG_{2,j}$) related to the second content (C2), where at least one between the first content segment identifier (SEG-$ID_{1,i}$) and the second content segment identifier (SEG-$ID_{2,j}$) is included in a first-content reproduction list (L1) and, respectively, in a second-content reproduction list (L2) audiovisual segments to be reproduced according to a succession defined for said first content (C1) and, respectively, second content (C2);

generating (S30) a streaming linear channel reproduction list (LLOTT), said list (LLOTT) comprising a first streaming linear channel segment identifier (SEG-$ID_{L,k}$) and a second streaming linear channel segment identifier (SEG-$ID_{L,l+1}$) each identifying, respectively, a first and a second audiovisual streaming linear channel segment ($SEG_{L,k}$, SEG-$ID_{L,k+1}$) and obtained on the basis of, respectively, the first content segment identifier (SEG-$ID_{1,i}$) and the second content segment identifier ($SEG_{2,j}$), and in which the streaming linear channel reproduction list (LLOTT) specifies that the second streaming linear channel segment (SEG-$ID_{L,k+1}$) is to be reproduced in succession immediately after the first streaming linear channel segment ($SEG_{L,k}$).

In this and in the other aspects, embodiments or examples: preferably, the first content and the second content are to be reproduced according to a succession sequence predetermined by a content supplying unit, and/or set by a playout; also preferably, the streaming linear channel reproduction list (LLOTT) respects the reproduction order of the first content and of the second content as established for the streaming linear channel; also preferably, generating the streaming linear channel reproduction list is independent of the request of one or more users. Preferably, the step of generating a streaming linear channel reproduction list (LLOTT) comprises determining the order with which the segments follow in this list $L_{OTT}$ independently of a request (relating to viewing the linear channel) of a user and/or independently of each request received from one or more users. Preferably, the step of generating a streaming linear channel reproduction list (LLOTT) comprises determining the order with which the segments follow one another on the basis of a set reproduction sequence of the first and of the second content; in particular, said set sequence is independent of each request received from one or more users.

Aspect A2: Method according to the aspect A1, wherein preferably said first audiovisual segment relating to the first content is the last segment of the first content, and preferably said second audiovisual segment relating to the second content is the initial segment of the second content.

Aspect A3: Method according to the aspect A1 or A2, wherein at least one of the first first-content reproduction list and the second content-reproduction list is a list containing a finite number of segments.

Aspect A4: Method according to one of the preceding aspects, wherein the at least one of the first-content reproduction list and the second-content reproduction list is obtained in advance (i.e. relatively to) and independently of programming of the streaming linear channel. In other words, the first and second-content reproduction lists are obtained before the content reproduction sequence is determined and/or independently of this reproduction sequence.

Aspect A5: Method according to one of the preceding aspects, wherein the information contained in each segment corresponding to the first and second streaming linear channel segment identifier is the same information contained in the first segment relating to the first content and, respectively, to the second segment relating to the second content.

Aspect A6: Method according to one of the preceding aspects, wherein the first content segment refers to live content, and the second content segment refers to offline content obtained by compressing without time constraints.

Aspect A7: Method according to one of the preceding aspects, wherein at least one of the first and the second streaming linear channel segment identifier is the same as the first content segment identifier and, respectively, second content segment identifier.

Aspect A8: Method according to one of the preceding aspects, in which amongst the first linear channel segment identifier and the second linear channel segment identifier there is inserted, in the streaming linear channel reproduction list, an indicator of discontinuity of content that identifies a discontinuity between information included in the first segment of content and information included in the second segment of content.

Aspect A9. Device (200) for composing a streaming linear channel to be transmitted on the basis of audiovisual segments to be reproduced in succession, the streaming linear channel comprising at least a first audiovisual content obtained from a first source (S1), and a second audiovisual content obtained from a second source (S2), the device comprising:

an interface unit (210) configured to obtain (S10) a first content segment identifier (SEG-$ID_{1,i}$) which identifies a first audiovisual segment ($SEG_{1,i}$) related to the first content (C1);

wherein the interface unit (210) is further configured to obtain a second content segment identifier (SEG-$ID_{2,j}$) that identifies a second audiovisual segment ($SEG_{2,j}$) related to the second content (C2), wherein at least one of the first content segment identifier (SEG-$ID_{1,i}$) and the second content segment identifier (SEG-$ID_{2,j}$) is included in a reproduction list of first content (L1) and, respectively, in a reproduction list of second content (L2) containing audiovisual segments to be reproduced according to a succession defined for said first content (C1) and, respectively, second content (C2);

a processing unit (210) configured to generate a streaming linear channel reproduction list (LLOTT), said streaming linear channel list (LLOTT) comprising a first streaming linear channel segment identifier (SEG-$ID_{L,k}$) and a second streaming linear channel segment identifier (SEG-$ID_{L,l+1}$) each identifying, respectively, a first and a second audiovisual streaming linear channel segment ($SEG_{L,k}$, SEG-$ID_{L,k+1}$) obtained on the basis of, respectively, the first content segment identifier (SEG-$ID_{1,i}$) and the second content segment identifier ($SEG_{2,j}$), and wherein the streaming linear channel reproduction list (LLOTT) specifies that the second streaming linear channel segment (SEG-$ID_{L,k+1}$) is to be reproduced in succession immediately after the first streaming linear channel segment ($SEG_{L,k}$).

Aspect A10: Device according to the aspect A9, wherein the device (200) comprises a transmission unit (230) configured to send said streaming linear channel reproduction list (LLOTT) to one or more user devices ($250_1$, . . . $250_i$, . . . ).

Aspect A11: System for composing a streaming linear channel to be transmitted on the basis of audiovisual segments to be reproduced in succession, the system comprising a device (200) for composing a streaming linear channel according to claims 10 and 11, and one or more user terminals ($250_1, \ldots 250_i, \ldots$) configured to receive the streaming linear channel reproduction list (LLOTT) from the device (200) for composing a streaming linear channel.

Aspect A12: System according to the aspect A11, further comprising a first source of audiovisual content (S1) and a second source of audiovisual content (S2), and wherein the interface unit (210) comprised in said device (200) is configured to receive the identifier of first segment of first content and the identifier of second segment of second content from the first source (S1) and, respectively, second source (S2).

Aspect A13: Computer program comprising instructions configured to perform, when said program is run on a computer, all the steps according to any one of the method aspects A1 to A8.

Aspect A14: Device (250) for reproducing a streaming linear channel transmitted on the basis of audiovisual segments to be reproduced in succession, the streaming linear channel comprising at least one first audiovisual content obtained from a first source (S1), and a second audiovisual content obtained from a second source (S2), the device comprising:

a receiving unit (252) configured to receive a streaming linear channel reproduction list (LLOTT), said list (LLOTT) comprising a first streaming linear channel segment identifier (SEG-$ID_{L,k}$) and a second streaming linear channel segment identifier (SEG-$ID_{L,l+1}$) each identifying, respectively, a first and a second audiovisual streaming linear channel segment ($SEG_{L,k}$, SEG-$ID_{L,k+1}$) and obtained on the basis of, respectively, a first content segment identifier (SEG-$ID_{1,i}$) and a second content segment identifier ($SEG_{2,j}$), wherein said first content segment identifier (SEG-$ID_{1,i}$) and said second content segment identifier ($SEG_{2,j}$) belong to a first-content reproduction list (L1) and, respectively, to a second-content reproduction list (L2) containing audiovisual segments to be reproduced according to a succession defined for this first content (C1) and, respectively, second content (C2), and wherein the streaming linear channel reproduction list (LLOTT) specifies that the second streaming linear channel segment (SEG-$ID_{L,k+1}$) is to be reproduced in succession immediately after the first streaming linear channel segment ($SEG_{L,k}$).

Aspect A15: Device (250) according to claim 15, wherein the receiving unit (252) is further configured to receive a content discontinuity indicator that indicates a discontinuity between:

the information comprised in the first streaming linear channel segment ($SEG_{L,k}$) and related to the first content (C1), and information comprised in the second streaming linear channel segment (SEG-$ID_{L,k+1}$) and referring to the second content (C2).

LIST OF FIGURES

FIG. 1a illustrates a block diagram for the transmission of linear channels are traditional broadcasting means according to the prior art;

FIG. 1b illustrates a block diagram for transmitting streaming linear channels according to the prior art;

DETAILED DESCRIPTION OF THE INVENTION

Figure 2:
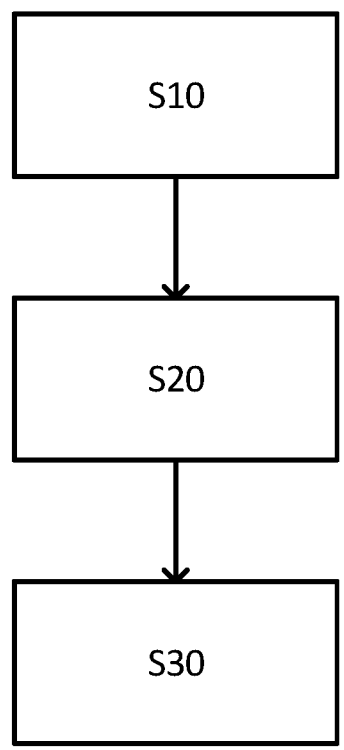
FIG. 2 illustrates a flow diagram relating to a method for composing a streaming linear channel according to an embodiment.

Generally, the invention comprises composing a streaming linear channel list (LLOTT) containing at least two identifiers, each relating to a segment, wherein one segment refers to a first audiovisual content C1 and the other segment relates to a second audiovisual content C2. The streaming list defines (implicitly or explicitly, see below) the reproduction succession—for the streaming linear channel—of the segments identified by the respective identifiers. Each of the identifiers is obtained from segment identifiers inside a reproduction succession defined by respective lists (L1, L2) that are specific for this content. The list LLOTT is accordingly obtained on the basis of each of the lists L1 and L2, each defined for each of and limited to the respective content C1 and C2 (in other words, start lists L1 and L2 do not take into account the presence of other possible contents, whereas the streaming list joins together the contents in a manner that is simple to obtain). For example, a method is provided that generates (S30) a streaming linear channel reproduction list (LLOTT), the list (LLOTT) comprising a first streaming linear channel segment identifier (SEG-$ID_{L,k}$) and a second streaming linear channel segment identifier (SEG-$ID_{L,l+1}$) that each identifies, respectively, a first and a second audiovisual streaming linear channel segment ($SEG_{L,k}$, SEG-$ID_{L,k+1}$) and is obtained on the basis of, respectively, a first content segment identifier (SEG-$ID_{1,i}$) and second content segment identifier ($SEG_{2,j}$), and wherein the streaming linear channel reproduction list (LLOTT) specifies that the second streaming linear channel segment (SEG-$ID_{L,k+1}$) is to be reproduced in succession immediately after the first streaming linear channel segment ($SEG_{L,k}$). A linear channel comprises an audiovisual service in which a continuous stream flows in real time from the provider of services (or provider of content) to the terminal device (or to several terminal devices), wherein the user cannot (and/or the users cannot) control the chronological order in which the contents are displayed. A linear channel is thus comprised in a service of the linear television, wherein linear television means a television transmission service (of audiovisual content) as in the traditional form of television services provided by operators of satellite, terrestrial, cable and/or direct-to-the-home broadcasting, wherein the program content is transmitted according to a defined schedule and is intended for consumption in real time by the end user. The service thus provides an essentially continuous flow that flows from the provider of content to the end device located in the network of the end user. A streaming linear channel is thus comprised in a linear channel, wherein transmission to one or more users occurs through streaming on the Internet, for example by http streaming protocol means. Reference is also made to ITU-T H-720 of 10/2008, which provides definitions for linear services.

One method according to a first embodiment of the invention will now be disclosed with reference to FIG. 2. For purely illustrative purposes, reference will also be made to the diagram of FIG. 3. The method refers to the composition, preferably in a content supplying entity, of an audiovisual streaming linear channel to be transmitted on the basis of audiovisual segments to be reproduced in succession. An OTT (for example television) channel is an example of an audiovisual streaming linear channel; another example is represented by a linear television channel transmitted through streaming, connecting for example from an Internet site. The streaming linear channel comprises at least one first audiovisual content obtained from a first source S1, and a second audiovisual content obtained from a second source S2. Audiovisual content means an audiovisual service that comprises at least one between an audio service and a video service; optionally, the audiovisual service can contain data, preferably relating to the audiovisual service (data relating to information on the content, data of an application associated with the content, etc.); similar considerations apply to an audiovisual segment and in general to the use of the audiovisual term. Streaming transmission can be performed by a protocol that is suitable for this service, such as for example the HLS (Http Live Streaming Protocol, see for example RFC 8216, or developments thereof such as low latency HLS), DASH (as defined for example by ISO/IEC 23009-1 and subsequent versions, modifications or improvements), Smooth Streaming, etc. In these protocols, the audiovisual segments are also simply known as segments or chunks; apart from the name, a segment comprises information (e.g. frame), typically in compressed format, on the audio and/or video content and which thus enables a receiver to reproduce the audiovisual content.

A content supplying entity comprises a supplying entity that is suitable and/or configured to transmit one or more linear channels. In particular, this supplying entity of linear channels transmits the first and the second content on the basis of a reproduction succession sequence that is predetermined and/or independent of requests of each of the users who may benefit from such content. Examples of a supplying entity comprise: a (radio)television broadcaster of linear channels, a (radio)television platform that manages and broadcasts one or more linear (radio)television channels, an online platform that broadcasts one or more linear channels, etc. The predetermined reproduction succession can be set or determined by the content supplying entity. In one specific illustrative example, the predetermined succession can be provided by a playout device or by a storage device of reproduction sequences each comprised in the content supplying entity.

Figure 3:
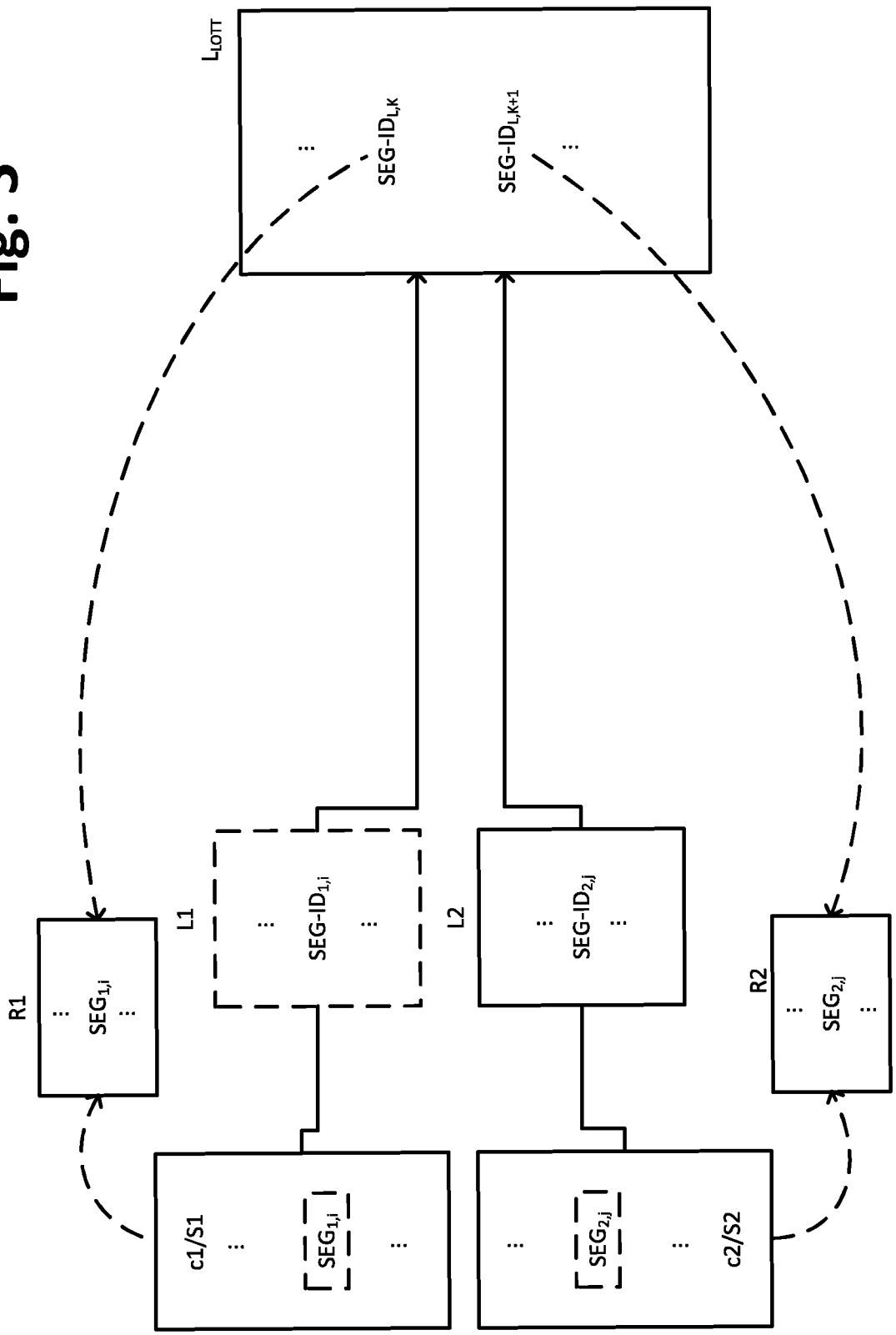
FIG. 3 shows a diagram for illustrating the operation of the invention.

The method comprises the step S10 of obtaining a segment identifier of the first content which identifies a first audiovisual segment related to the first content C1. In FIG. 3, this first segment is also indicated with $SEG_{1,i}$, and is the one that comprises audio and/or video information, preferably in compressed form; the corresponding identifier is on the other hand identified by $SEG\text{-}ID_{1,i}$. The index i indicates that other segments can also be there. Identifier means identification information that enables the segment to be identified individually and preferably includes an address from which it is possible to identify the respective segment. In one example, a segment is represented by a file containing data/information relating to an audiovisual fragment having a certain duration, and the identifier is represented by a URL or URI (absolute, or relative) from which it is possible to obtain the file, for example through an http get command. Instead of the URL or URI, it is conceivable to use any address system, for example an IP or MAC address from which to recover the segment.

In step S20, the method provides obtaining a second content segment identifier ($SEG\text{-}ID_{2,j}$ in FIG. 3) which identifies a second audiovisual segment ($SEG_{2,j}$ also in FIG. 3) of the second content. Also here, the second segment refers to information (e.g. frame) that enables an audio and/or video fragment to be reproduced having a certain duration, whereas the identifier provides information to identify the fragment. It is pointed out that the order of execution of the steps of the method, including the order of steps S10 and S20, is not significant. In fact, the two steps can be run parallel, or the one before the other without altering the result.

At least one of the first content segment identifier and the second content segment identifier is comprised in a first-content reproduction list and, respectively, in a second-content reproduction list; this list thus contains audiovisual segments to be reproduced according to a succession defined by the list for the respective first or second content. As said, the succession is determined by the list, i.e. the list provides explicit or implicit information on the succession with which to reproduce the segments. For example, the position of the segment inside the list relating to the other segments indicates the reproduction order; in other words, each segment is reproduced according to the order in which it appears in the list. In another example, it is conceivable to associate with a segment, and/or with the respective identifier, information that indicates the order or the position or the reproduction time. It is further conceivable that the identifier comprises information on the reproduction order (for example by a time stamp added to the reproduction order or naming the segments or the address thereof with a consecutive alphanumeric tag, etc.). Various examples are usable until the succession is established and determined with which the segments have to be reproduced. Returning to the list and taking the first content by way of example, the first content segment identifier belongs to an already predefined reproduction list for the first content. In other words, this list has been obtained or generated in advance of the composition of the linear channel and/or independently of the composition. In one example, the list is stored in a storage device (e.g. c/o databank and/or a server), so that at the moment of composing the linear channel the list—or at least one or more of the segments contained therein—is simply retrieved from this storage device. The same considerations apply to the case of the second content, i.e. if the list of the second content has been generated preliminarily. A preliminarily generated list of segments can be for example obtained at already closed contents, i.e. for which the start and the end at the moment of the transmission are already known such as for example films, repeats of television or radio programs, advertisements, gaps between programs, etc. As illustrated below, however, it is possible for at least one of the two contents with the respective list to be generated on the fly, i.e. at the moment of composing the linear channel, or in other words at the same time or nearly at the same time as the composition of the linear channel.

This is for example the case with open content, i.e. content for which, once the content has commenced the end of the content has not yet been reached or is not yet known whilst the content is transmitted; this is for example the case with a live program that has to be broadcast and thus streamed with the least latency as possible with respect to the moment of the production of the same program. In this case it is possible to generate the segments as soon as the audiovisual flow is made available without the need to have to store the segments beforehand.

In step S30, the method includes generating a streaming linear channel reproduction list, wherein the list comprises a first streaming linear channel segment identifier (SEG-$ID_{L,k}$ in FIG. 3) and a second streaming linear channel segment identifier (SEG-$ID_{L,l+1}$ in FIG. 3). Preferably, generating the streaming linear channel reproduction list $L_{OTT}$ is a step performed at the content supplying entity. Preferably, the step of generating the streaming linear channel reproduction list $L_{OTT}$, and in particular determining the order with which the segments follow in this list $L_{OTT}$, is performed independently of any user request; in other words, the order with which the segments are included in the list $L_{OTT}$ is determined independently of a request received from any of the users; this order respects the segment reproduction succession for each content and the reproduction sequence of the first content and of the second content as established from the succession sequence of predetermined reproduction succession discussed above. In other words, a user can ask to obtain a list relating to a linear channel; this list can contain a certain total number of segments (depending for example on the moment in which the user requests the time window for the list as e.g. in the case of the rolling window); nevertheless, the order of the segments remains independent of the request of a user or of any of the users. Further, generating is preferably executed at the content supplying entity, i.e. at the entity set up to distribute the linear channel. This list $L_{OTT}$ can be delivered to one or more users who have requested the list; intermediate manipulations of the list do not affect the fact that the list is generated as illustrated above. Each of these segment identifiers identifies a first audiovisual streaming linear channel segment (SEG$_{L,k}$ in FIG. 3) and, respectively, a second audiovisual streaming linear channel segment (SEG$_{L,k+1}$ in FIG. 3). As already explained with reference to the identifiers of segments of the first and second content lists, each of the segments SEG$_{L,k}$ and SEG$_{L,k+1}$ contains the information (e.g. frame) that enables a respective audiovisual fragment of the respective content to be reproduced, whilst the respective identifiers clearly indicate how to identify each of the respective segments; nevertheless, these identifiers are provided inside the list of the streaming linear channel, and no longer inside the start list or no longer with reference to the start content independently of the presence of other contents. It is in fact significant that the succession of the segments is now that relating to or defined by the streaming linear channel reproduction list, and not that of the start list, where present.

Each first streaming content segment identifier SEG-$ID_{L,k}$ and, respectively, second streaming content segment identifier SEG-$ID_{L,k+1}$ is obtained on the basis of the first content segment identifier SEG-$ID_{1,i}$ and, respectively, of the second content segment identifier SEG-$ID_{2,j}$. The streaming linear channel reproduction list (LLOTT) specifies that the second streaming linear channel segment (SEG-$ID_{L,k+1}$) is to be reproduced in succession immediately after the first streaming linear channel segment (SEG$_{L,k}$). In other words, the information comprised in the segments relating to the first and second content are not modified, whilst a new list is generated for the streaming channel that specifies that the segment of the second content must be reproduced immediately after the segment of the first content. In other words, a new list is generated that joins together the segment identifiers without affecting the comprised information (e.g. frame) of the segments. It is immediately clear that this operation, in which it is necessary to work on the identifiers and then substantially on strings, requires much less calculating power than working on the content of the segments, i.e. on audio and/or video encoding (i.e. on frame encoding).

One non-limiting example of the invention will now be explained with reference to FIG. 3, in which two sources of content, S1 and S2, are illustrated, each containing the content C1 and, respectively, C2. A databank, a server, and/or a cloud service are examples of each of these sources, wherein each can also contain other contents. It is assumed for the moment that both contents are of closed type, i.e. that the start and end of each of the contents is known; each of the contents has been accordingly segmented already, preferably after being compressed. Preferably, compression is of the off-line type, or without time constraints such as for example in the case of VOD compression. Accordingly, each of the sources S1 and S2 already has the respective lists L1 and L2 available, each comprising one or more segments of the respective content and each that defines the reproduction succession of the segments of the respective content. As the contents are closed, also the respective lists will be closed, i.e. they specify an initial segment, a final segment and a reproduction succession relating to these segments. If the two contents C1 and C2 are desired to be reproduced one after the other on the linear channel, it would not be possible to use the two lists because—amongst other reasons—each of these lists is designed to terminate the transmission when the respective final segment is reached. Further, these lists can contain other parameters that are closely connected to the closed content that would make the lists unusable in linear transmission. Following the invention, on the other hand, a list LLOTT (streaming linear channel list, or OTT linear channel list) is generated in which segment identifiers are inserted that are determined on the basis of the segment identifiers of the start lists L1 and L2. In detail, starting from the segment identifier SEG-$ID_{1,i}$ contained in the first list L1, a segment identifier SEG-$ID_{L,k}$ is generated to be inserted in the streaming list LLOTT. Similarly, the identifier SEG-$ID_{L,++1}$ that is to be inserted in the streaming list LLOTT starting from the identifier SEG-$ID_{2,j}$ present in the start list L2 is generated. Nevertheless, in arranging the identifiers SEG-$ID_{L,k}$ and SEG-$ID_{L,k++1}$ in the streaming list LLOTT, the streaming list LLOTT specifies that the segment SEG-$ID_{L,++1}$ has to be reproduced immediately after the segment SEG-$ID_{L,k}$. In other words, in the creation of the new list, the reproduction sequence of two segments belonging to two contents coming from different sources is determined. In the example illustrated in the figure, the streaming segment identifier SEG-$ID_{L,k}$ identifies or directs to the segment SEG-$ID_{1,i}$ identified by the start identifier SEG-$ID_{1,i}$, but with reference to a repository R1 (an electronic or digital content magazine) to which the segment has been copied for convenience. Similar considerations apply to the identifier SEG-$ID_{L,k+1}$, the segment SEG-$ID_{2,j}$ and the start identifier SEG-$ID_{2,j}$. This solution thus simply involves updating the identifiers and copying the files corresponding to the segments without affecting the information content thereof (e.g. frame). It is pointed out that it is possible to add to the streaming list also identifiers relating to other segments (not illustrated in FIG. 3) of each content, for example: one, a multiplicity or all the identifiers corresponding to the segments of the content C1 that precede the first segment $SEG_{1,i}$; similarly and independently, one, a multiplicity or all the identifiers that correspond to the segments of the content C2 that precede the first segment $SEG_{2,j}$.

In the example of FIG. 3 one or both the repositories R1 and R2 can be omitted, in which it is sufficient to obtain the segment identifiers of the lists L1 and L2 and position the segment identifiers in the new streaming list LLOTT, specifying through the list LLOTT that the segment coming from the second list has to be reproduced in succession immediately after the segment obtained from the first list. The reproduction succession can be specified in the streaming list LLOTT in a variety of implicit and/or explicit modes as also disclosed above. Further, in the example in FIG. 3 it is possible to replace one of the two closed contents with an open content, i.e. with a content characterized by the fact that the end is not yet known at the moment in which the transmission thereof commences; in this case there will thus not be a pre-existing list and the segments will be generated in real time just like the respective identifiers that must therefore be inserted into the streaming list LLOTT in real time, but always respecting the reproduction succession defined by the streaming list LLOTT. In addition, in the example in FIG. 3, it is conceivable to replace both closed contents with open contents; the list LLOTT will thus define the order of reproduction of a live content after another live content.

Optionally, in the method of this embodiment, the first audiovisual segment relating to the first content is the last segment of the first content; optionally and independently, the second audiovisual segment relating to the second content is the initial segment of the second content. In this manner, it is possible to join together the end of a first content with the start of a subsequent content without having to manipulate the data/information (e.g. frame) contained in the segments, i.e. without having to again encode the video and/or audio frame comprised in the respective segments. The invention is nevertheless not limited by the exact end of one content joining the exact start of the next content. In fact, it is sufficient to establish that the first segment of the first content is set at a segment of the first content (also preceding the last segment of the first content), which will thus be the last reproduced fragment of the first content before the second content starts. For example, if it is desired to cut part of the closing credits of a film, it can be determined or established that the first segment $SEG_{1,i}$ does not coincide with the last segment of the start list but is instead a segment preceding the last segment, for example the first of the closing credit segments. Similar considerations apply to the initial segment, in particular the second segment can be a segment subsequent to the initial segment of the second content, preferably near the second content relating to the last segment of the second content. In other words, it is possible to vary artificially the final segment of the first content and the initial segment of the second content so that they do not necessarily correspond to the segment in the first position and in the last position inside the reproduction succession of the content. Similar considerations apply to an open content, for which the final segment cannot be exactly known at the moment of the start of the transmission; accordingly, the initial segment and the final segment of such a content are set on preset segments of the open content. This setting on predetermined segments can be made a priori (for example at a certain lapse of time from the start of the content), as well as (alternatively or additionally) dynamically, i.e. whilst the linear channel is transmitted, for example when it is desired to vary the duration of the respective content at the timing of the linear channel, for example in view of the programming schedule.

Optionally, in the method of this embodiment, at least one of the first-content reproduction list L1 and the second-content reproduction list L2 comprises or is a list containing a finite number of segments. This is for example the case if at least one of the two contents is a closed content, such as for example a VOD content, an advertisement or in general a program/content recorded independently of the type of compression, etc.

Further, in the method illustrated above, the streaming linear channel reproduction list $L_{LOTT}$, in addition to taking into account the reproduction succession of the segments identified in the list, takes into account the succession relating to two contents (or in other words: of the succession of a content with respect to a subsequent one, or of a content with respect to the preceding one; or more in general, of the succession of a content with respect to another content adjacent thereto in the reproduction succession); in contrast, each of the first-content reproduction list L1 and the second-content reproduction list L2 takes into account only the succession of the segments relating to only one content (in other words, only of the content to which the list refers). In particular, the defined reproduction succession (implicitly or explicitly) defined by the streaming list $L_{LOTT}$ respects the reproduction order of two successive contents, whereas each reproduction succession of the lists L1 and L2 does not even consider remotely the presence of another possible content. The fact that multiple segments of a list L1 or L2 may be in the same succession inside the streaming list $L_{LOTT}$ does not change the fact that overall the streaming list $L_{LOTT}$ follows its own reproduction succession (of the multiple contents C1 and C2 comprised and/or joined together therein) that in fact goes beyond the reproduction succession of each content taken alone.

Optionally, in the method of this embodiment, at least one of the first-content reproduction list L1 and the second-content reproduction list L2 is obtained in advance of and independently of programming of the streaming linear channel. This is for example the case of a closed content that has been preferably compressed in advance, i.e. before transmission of the content on the linear channel starts, such as for example in the case of a VOD content, advertisement, gap between programs etc.

Optionally, in the method of this embodiment, the information contained in each segment corresponding to the first and second streaming linear channel segment identifier is the same information contained in the first segment relating to the first content and, respectively, to the second segment relating to the second content. In other words, the audio and/or video data comprised in each of the segments do not necessarily have to be modified; this does not prevent, if it is deemed to be necessary, it being also possible to process (for example recode or (re)compress) the audio and/or video data present in the segments.

Optionally, in the method of this embodiment, the first content segment $SEG_{1,i}$ refers to a live content, and the second content segment $SEG_{2,j}$ refers to an offline content obtained by compressing without time constraints (an example of a closed content above introduced). In this case, the streaming linear channel thus first transmits a live content and then immediately afterwards a recorded content. The opposite case is also true, i.e. the case in which the first segment refers to an offline content, and the second segment to a live content. The offline encoding is an encoding executed without time constraints and thus differs from a typical live encoding (or in real time) by the fact that it has sufficient time to be able to compress the content; this can comprise performing different stages on the content in order to optimize the compression factor by maintaining high quality for the compressed content. Offline encoding is used for example for VOD contents. On the other hand, a live content has to be compressed with narrow time constraints linked to the maximum acceptable latency for live transmission (i.e. maintaining the latency as small as possible); this means that the encoder, although it is powerful from a computational point of view, is not able to obtain high compression ratios.

Optionally, in the method of this embodiment, at least one of the first SEG-ID$_{L,k}$ and the second SEG-ID$_{L,k++1}$ streaming linear channel segment identifier is the same as the first content segment identifier SEG-ID$_{1,i}$ and, respectively, second content segment identifier SEG-ID$_{2,j}$. As anticipated with reference to FIG. 3, in fact, the identifier can be the same start identifier if the segment has not been moved to another repository but is accessible from the same repository addressed by the start list.

In the case of a live content, as anticipated above, the segments are created on the fly, just like the respective identifiers (e.g. the URL/URI from which to download the segments). It is thus conceivable:

(i) to create a dedicated list for the live event (for example, in the form of a list L1 or L2 as discussed above), and store the list so as to be able to use it for other purposes, including making the event available to other users even if it is no longer live (deferred, with delayed start, etc.); and/or (ii) to insert the segments created on the fly (with the respective identifiers, e.g. URL/URI created on the fly) directly in the streaming list LLOTT without passing through a list dedicated to the event (i.e. without passing through one of the lists L1 and L2, which in fact can be omitted from FIG. 3 if the respective content is a live content).

Optionally, in the method according to one of the preceding aspects, between the first linear channel segment identifier and the second linear channel segment identifier a content discontinuity indicator there is inserted in the streaming channel reproduction list that identifies a discontinuity between information (e.g. frame) included in the first segment of content and information (e.g. frame) included in the second segment of content. Information included in the segment means the video and/or audio data necessary for displaying/reproducing the audiovisual fragment corresponding to the segment; for example, this information is represented by the frames of the audiovisual fragment/segment. This discontinuity indicator can thus facilitate the operation of the receiver (user device), which can thus prepare itself in advance for the continuity change of the frames, for example by resetting some (or all) decoding parameters and/or resetting some of the parameters of the list parser. In this manner, the decoder on the user side is able to react faster and without jumps to reproduce the second content immediately after the first content, in particular if the latter have not been encoded in the same manner.

With reference to FIG. 3, it is noted that both lists L1 and L2 can be omitted, when for example it is desired to send a live content through streaming subsequently to (in the sense of immediately after) another live event. Also in this case, it will be possible to join the two events simply because it is sufficient to create the streaming list on the basis of operations on strings without having to modify the video and/or audio data contained in each segment produced.

The streaming linear channel list LLOTT, once generated, can be sent to one or more user devices. Examples of user devices are represented by television decoders that are able to receive streaming from a communication network (such as the Internet), computer with browser, Tablet, smartphone, and in general any device that is able to be connected to a network and configured to receive a list LLOTT as disclosed above. As mentioned, streaming to such a user device is also known as OTT, and is preferably managed by an application that is able to perform this streaming. The decoder, once it has received the list LLOTT, downloads the segments identified by the respective identifiers contained in the list, so that it can decode the segments and make the segments available for display. The above list can be implemented on the basis of any one of the existing protocols, preferably http streaming protocols such as HLS, DASH, Smooth Streaming, etc. or a combination thereof.

What has been said above accordingly applies to the embodiments disclosed below, and vice versa. Repetitions of the same or respective explanations will be accordingly avoided.

Figure 4A:
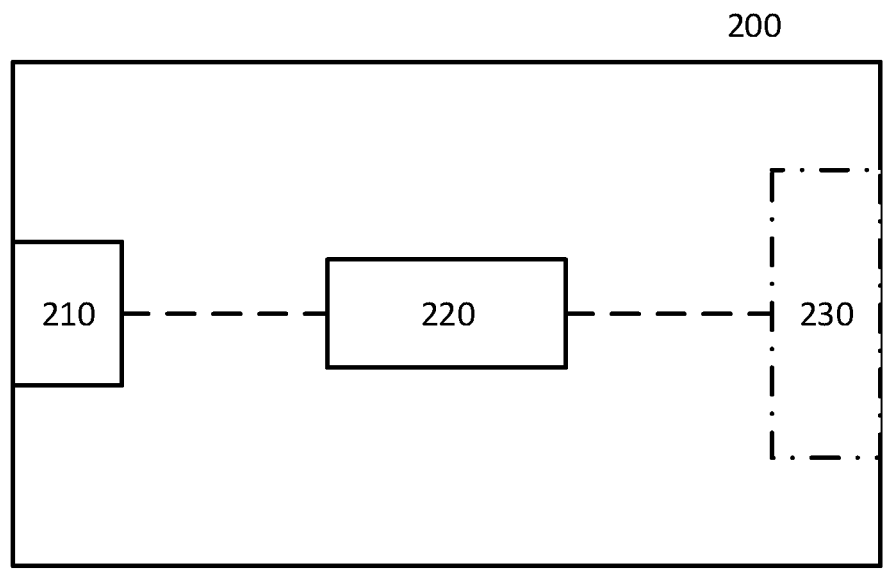
FIG. 4a illustrates a block diagram relating to a device for composing a streaming linear channel according to an embodiment.

With reference to FIG. 4, a second embodiment will now be illustrated relating to a device for composing a streaming linear channel to be transmitted on the basis of audiovisual segments to be reproduced in succession. A content supplying entity is an example of the device for composing a linear channel. The streaming linear channel comprises at least one first audiovisual content C1 obtained from the first source S1, and at least one second content C2 obtained from a second source S2. The device thus comprises an interface unit 210 and a processing unit.

The interface unit 210 is configured to obtain a second content segment identifier (SEG-ID$_{2,j}$) that identifies a second audiovisual segment (SEG$_{2,j}$) relating to the second content (C2), wherein at least one of the first content segment identifier (SEG-ID$_{1,i}$) and the second content segment identifier (SEG-ID$_{2,j}$) is comprised in a first-content reproduction list (L1) and, respectively, in a reproduction second content list (L2). A list such as the lists L1 and L2 contains audiovisual segments to be reproduced according to a succession defined for the respective content; in other words, the list L1 defines a specific reproduction succession for the first content (C1), and the list L2 defines a specific reproduction succession for the second content (C2); as explained above, specifying the succession can be implicit (for example, implicit in the order in which the segments are present or listed in the list) or explicit. For example, the Interface unit includes a network interface controller for communicating with the sources on which the lists L1 and/or L2 are stored; communication between the device 200 and the sources (or other devices such as repository) can occur by Intranet, the Internet, Ethernet, satellite channel etc, or any combination thereof according to circumstances.

The processing unit (210) is configured to generate a streaming linear channel reproduction list (LLOTT), wherein the list LLOTT comprises a first streaming linear channel segment identifier (SEG-ID$_{L,k}$) and a second streaming linear channel segment identifier (SEG-ID$_{L,l+1}$); each of them identifies, respectively, a first and a second audiovisual streaming linear channel segment (SEG$_{L,k}$, SEG-ID$_{L,k+1}$) obtained on the basis of, respectively, the first content segment identifier (SEG-ID$_{1,i}$) and the second content segment identifier (SEG$_{2,j}$). The streaming linear channel reproduction list (LLOTT) specifies that the second streaming linear channel segment (SEG-ID$_{L,k+1}$) is to be reproduced in succession immediately after the first streaming linear channel segment (SEG$_{L,k}$). The processing unit comprises a processor, concentrated in an apparatus such as a computer or a server or distributed in different computers; the processing unit accordingly comprises also the processing unit supplied by a cloud, which can then execute the operations disclosed above.

Optionally, see the dotted block 230 shown in FIG. 4, the device 200 can contain a transmission unit 230 configured to send the streaming linear channel reproduction list (LLOTT) to one or more user devices ($250_1$, ... $250_i$, ...). For example, transmission can occur on a communication network like the Internet, Intranet, etc. It is noted that optionally the transmission unit 230 can coincide with the interface unit 210. In particular, it is preferable to send the same streaming list (LLOTT) to several users. Further, the list can be sent in push and/or in response to a request of each user (for example by http get command); it is obvious that the list, if sent to a plurality of users, does not have to be necessarily sent simultaneously; in practice, especially if it has been sent in response to requests of each user, the same list can be sent at different instants of time. In other situations, in reaction to requests of one or more users, the list is not sent immediately after receiving the respective request, but with a certain delay linked to the instant at which a new segment has been generated and included in the list; in this case, it is possible to achieve low latency. Alternatively or in combination, it is conceivable to maintain on the device a session for each of the users, and send to each of these users a specific list for the session associated with said user, wherein the specific list is obtained on the basis of the streaming linear channel list (LLOTT). In this case, the segment identifiers of the list $L_{LOTT}$ are still generated independently of the request of each user (or, as illustrated above, the order of segments in the list $L_{LOTT}$ is independent of the user requests); nevertheless, the list can include some segments on the basis of the session corresponding to a respective user. It is pointed out that the streaming linear channel list (LLOTT) in one example comprises a list of the rolling window type, i.e. only a certain number of segments is included (fixed or variable within a certain range) in which the segment identifiers included in the list are updated periodically with the advancement of the transmission of the linear channel.

Figure 4B:
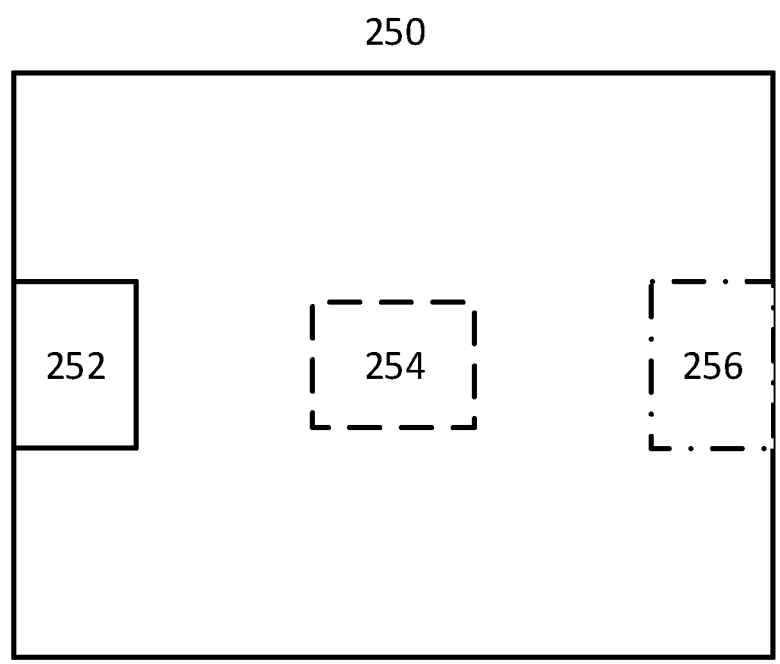
FIG. 4b illustrates a block diagram relating to a device for reproducing a streaming linear channel according to an embodiment.

With reference to FIG. 4b, a fourth embodiment will now be illustrated relating to a device (250) for reproducing a streaming linear channel transmitted on the basis of audiovisual segments to be reproduced in succession, the streaming linear channel comprising at least one first audiovisual content obtained from a first source (S1), and a second audiovisual content obtained from a second source (S2). The device comprises a receiving unit (252) configured to receive a streaming linear channel reproduction list (LLOTT). This list (LLOTT) comprises a first streaming linear channel segment identifier (SEG-$ID_{L,k}$) and a second streaming linear channel segment identifier (SEG-$ID_{L,k+1}$) each identifying, respectively, a first and a second audiovisual streaming linear channel segment ($SEG_{L,k}$, SEG-$ID_{L,k+1}$) and obtained on the basis of, respectively, a first content segment identifier (SEG-$ID_{1,i}$) and a second content segment identifier ($SEG_{2,j}$). It is pointed out that the first content segment identifier (SEG-$ID_{1,i}$) and the second content segment identifier ($SEG_{2,j}$) belong to a reproduction list of the first content (L1) and, respectively, to a reproduction list of the second content (L2) containing audiovisual segments to be reproduced according to a succession defined for this first content (C1) and, respectively, second content (C2). In addition, the streaming linear channel reproduction list (LLOTT) specifies that the second streaming linear channel segment (SEG-$ID_{L,k+1}$) is to be reproduced in succession immediately after the first streaming linear channel segment ($SEG_{L,k}$). Accordingly, the device is able to receive a streaming list although the segments to be reproduced are those contained in a specific list for the content and not for streaming.

Optionally, the receiving unit (252) is further configured to receive a content discontinuity indicator indicating a discontinuity between (i) the information included in the first segment of the streaming linear channel ($SEG_{L,k}$) and related to the first content (C1), and (ii) information included in the second segment of the streaming linear channel (SEG-$ID_{L,k+1}$) and referring to the second content (C2). In this manner, the receiver can be prepared in advance of decoding of the second content, and thus reproduce the linear channel seamlessly, for example without jumps or unwanted black screens.

Optionally, the device (250) comprises a decoder (254) for decoding the segments identified by the respective identifiers. These segments can be downloaded from the receiving unit 252 and obtained for example in response to a request of the http get type (sent by a transmitting entity) or from the unit 252 if it is a transceiving unit. Further, the device 250 can comprise an interface 256 for displaying, configured to display directly the audiovisual content decoded by the decoder 254, or send the audiovisual content to a screen connected by the unit 256. According to some examples, the interface 256 can contain a screen and/or can send the decoded content to a screen or to another device.

Figure 5:
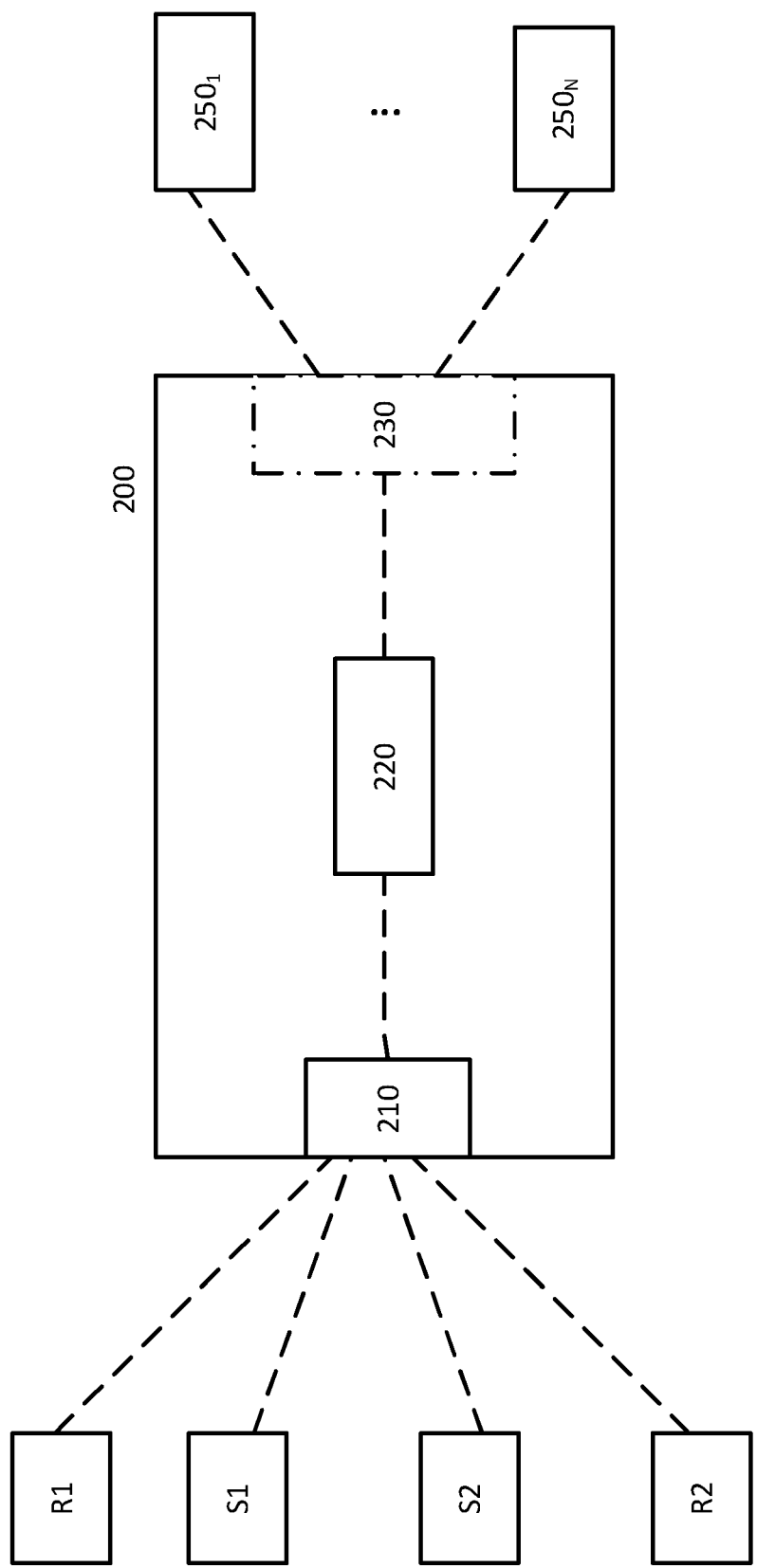
FIG. 5 illustrates a block diagram relating to a system for composing a streaming linear channel according to an embodiment.
Figure 6:
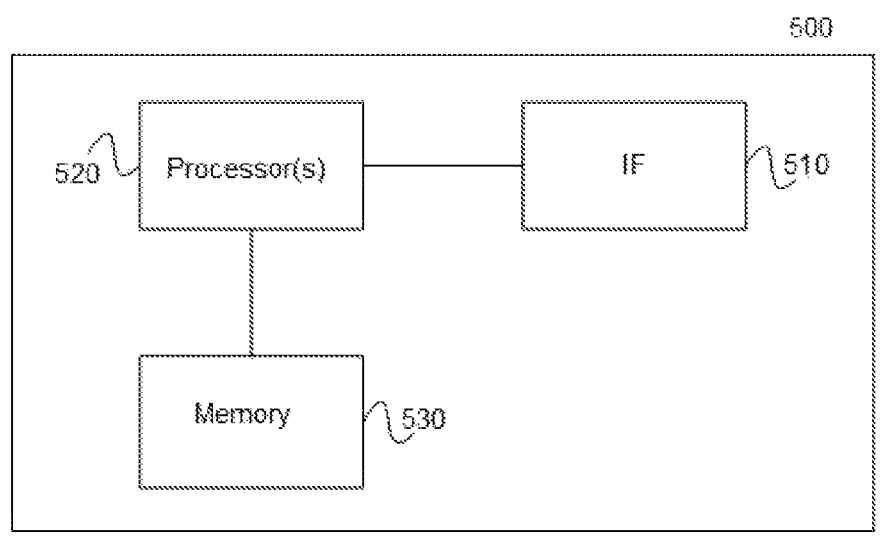
FIG. 6 is a block diagram of a computer capable of implementing the present invention according to one embodiment.

With reference to FIG. 5, a fourth embodiment will now be illustrated relating to a system for composing a streaming linear channel to be transmitted on the basis of audiovisual segments. The system comprises a device 200 as disclosed for example with reference to the second embodiment, and one or more user terminals ($250_1$, ... $250_i$, ...) that are able to communicate with the device 200 for example through the transmission unit 230 comprised therein. The system can optionally comprise a first source of audiovisual content S1 and a second source of audiovisual content S2. The interface unit 210 comprised in the device 200 can then be configured to receive the identifier of first segment of first content SEG-$ID_{1,i}$ from the first source S1 and the identifier of second segment of second content SEG-$ID_{2,j}$ from the second source S2.

Optionally, the device 200 can be configured to download the first segment $SEG_{1,i}$ and/or the second segment $SEG_{2,j}$ on the basis of the respective identifiers received. These segments can be downloaded from the source S1 and/or S2; alternatively or in combination, these segments can be downloaded from a repository R1 and/or, respectively, repository R2.

According to another embodiment, there is provided a processor program comprising instructions configured to execute, when the program is run on a computer, any step or combination of steps of the method and the variants thereof as described with reference to the first embodiment. Figure illustrates a block diagram exemplifying a computer 500 capable of running the aforesaid program. In particular, the computer 500 comprises a memory 530 for storing the instructions of the program and/or data necessary for the execution thereof, a processor 520 for executing the instructions and an input/output interface 510.

According to a further embodiment, a medium is provided for supporting a processor program comprising instructions configured to execute, when the program is run on a computer, a step or combination of steps according to the method described in the first embodiment. Examples of a medium are a static and/or dynamic memory, a fixed disk or any other medium such as a CD, DVD, Blue Ray. Comprised in the medium there is also a means capable of supporting a signal constituting the instructions, including a means of cable transmission (Ethernet, lens, etc.) or wireless transmission (cellular, satellite, digital terrestrial transmission, etc.).

Figure 7:
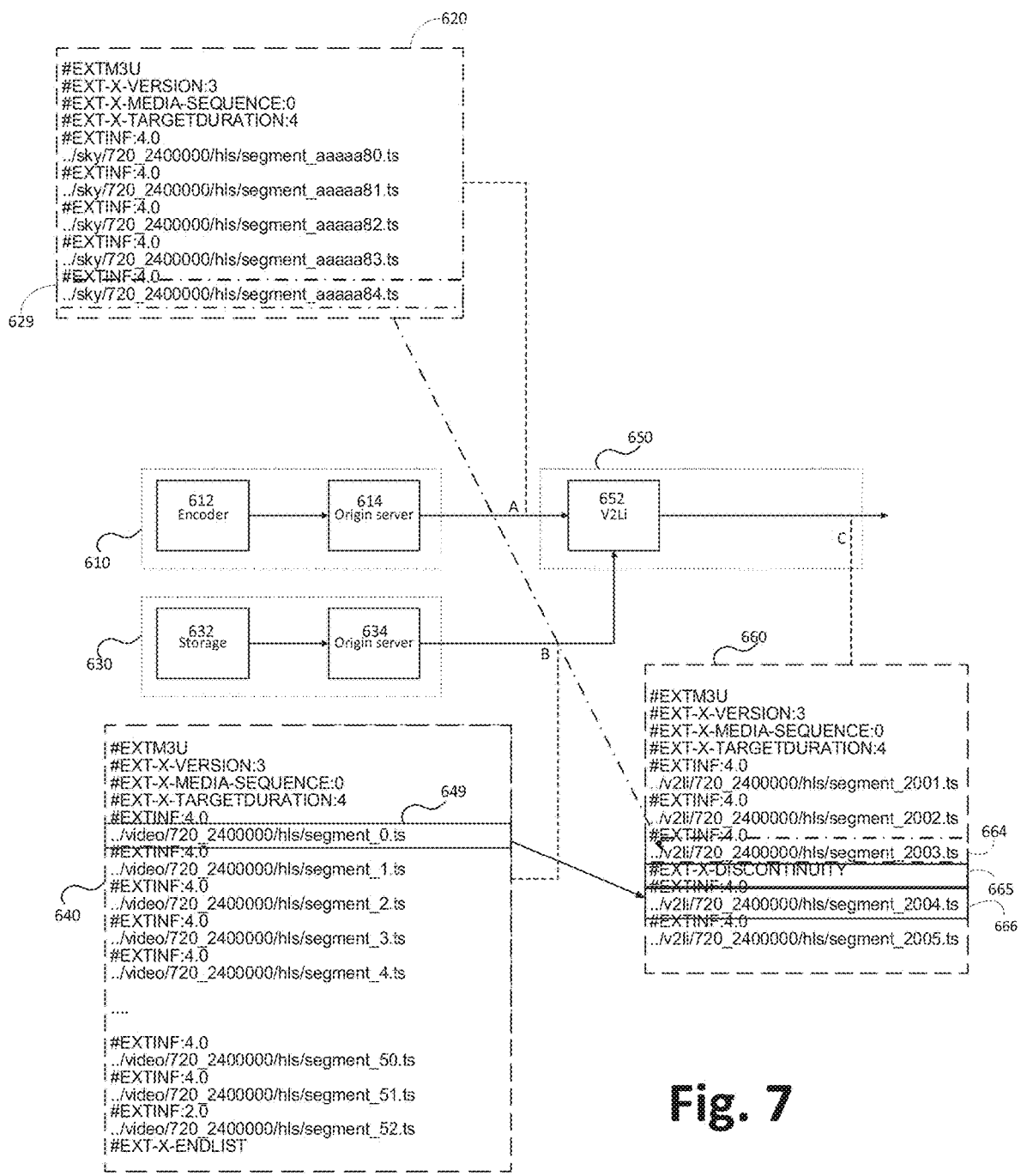
FIG. 7 illustrates in one example how the streaming linear channel list can be generated.

An embodiment of lists L1 and L2 and of generating the streaming list LLOTT will now be provided with reference to FIG. 7, wherein a first source S1, a second source S2 and a device for the composition of streaming linear channel 650 are represented. For example, the source S1 comprises an encoder 612 and an origin server 614, whereas the source S2 comprises a corresponding encoder 632 and an origin server 634; the servers constitute devices on which to store, also temporarily, the lists and optionally the respective segments. It is possible to omit the encoders, e.g. if the contents are supplied by other outer sources/encoders. The device 650 obtains from the first source S1 a list 620 (illustrated as visible in the interface A between the source and device), which represents one example of the list L1 discussed above. Similarly, the server obtains a second list 640 (like at the interface B between source and device) from the second source S2, this list being an example of the above list L2. In the example, the lists are disclosed according to the HLS streaming protocol. When composing the streaming linear channel list 660 (one example of the list LLOTT), the device generates the streaming linear channel segment identifier 664 by generating a URI that is based on the URI 629 comprised in the list 620; in this case, the file (corresponding to the segment) addressed by the URI 629 has been moved to another server and/or in another position of the server, and further the file has been renamed for convenience; thus the URI has been generated by taking into account this renaming and movement. Nevertheless, the data comprised in the file/segment have not been modified. It is thus clear that the device 650 does not do anything but work on strings by modifying the identifiers, i.e. the URIs. Similarly, the device 650 generates the identifier 666 on the basis of the identifier 649 comprised in the list 630, taking into account the fact that the file/segment has not been modified internally but only renamed and moved. Each of the lists 620 and 640 comprises other segments: those preceding 629 can be inserted into the streaming list 660 before the segment 664, by maintaining the same reproduction order relating to the segment 664; similarly, the segments subsequent to 649 in the list 640 can be inserted after the segment 666 by maintaining the same reproduction order relating to the segment 666. Thus, starting from two lists that are closed and thus reproducible only as single units, it is possible on the other hand to obtain a single list for the linear channel in which the different contents follow continuously. It is pointed out that it is not possible to obtain the linear channel by using the lists 620 and 640 just as they are without modifications as this would involve an interruption of the linear transmission at the end of the first list; to restore the channel, a mechanism should be activated through which the user terminal retrieves the second list; this would nevertheless cause gaps in transmission and reproduction (due to the activation and initializing a second session for the second list), with the result that it would no longer be that of a linear channel. Returning to the invention and to the example thereof, a low calculation power is required to perform such operations through which a list is thus obtained simply for a streaming linear channel list. The other tags on the lists are those that are known from HLS and are accordingly not disclosed here. As anticipated, if the files/segments have not been renamed or moved, it is possible to take and copy the identifier 629 as it is in position 664 in the list 660, provided that the segment 649 is copied to a reproduction position that is immediately subsequent to 664.

In the example in FIG. 7, also a discontinuity tag 665 (#EXT-X-DISCONTINUITY) is illustrated, positioned between the segment 664 and the segment 666; as illustrated above, the tag 665 indicates a discontinuity in the information/data contained in segment 666 with respect to segment 664. It is observed that this discontinuity refers to the information comprised in the segments, and does not refer to the discontinuity in the reproduction succession (which in fact remains unaltered, as the segment 666 is reproduced immediately after the segment 664 as if the tag 665 were not present for the purposes of the succession). The tag 665 can be the tag already provided by the HLS, or (alternatively or additionally) a tag conceived to indicate specifically a discontinuity between content C1 and C2 and/or between the segments 664 and 666. For example, such a tag can indicate that the segment that precedes the tag belongs to an audiovisual content, and the segment that follows the tag belongs to another audiovisual content. In one example, the indicator indicates that the segment preceding the indicator refers to a first program and/or the segment that follows the indicator refers to a second program; the tag can optionally comprise the name of the program to which the segment that precedes and/or follows the tag refers.

Figure 8:
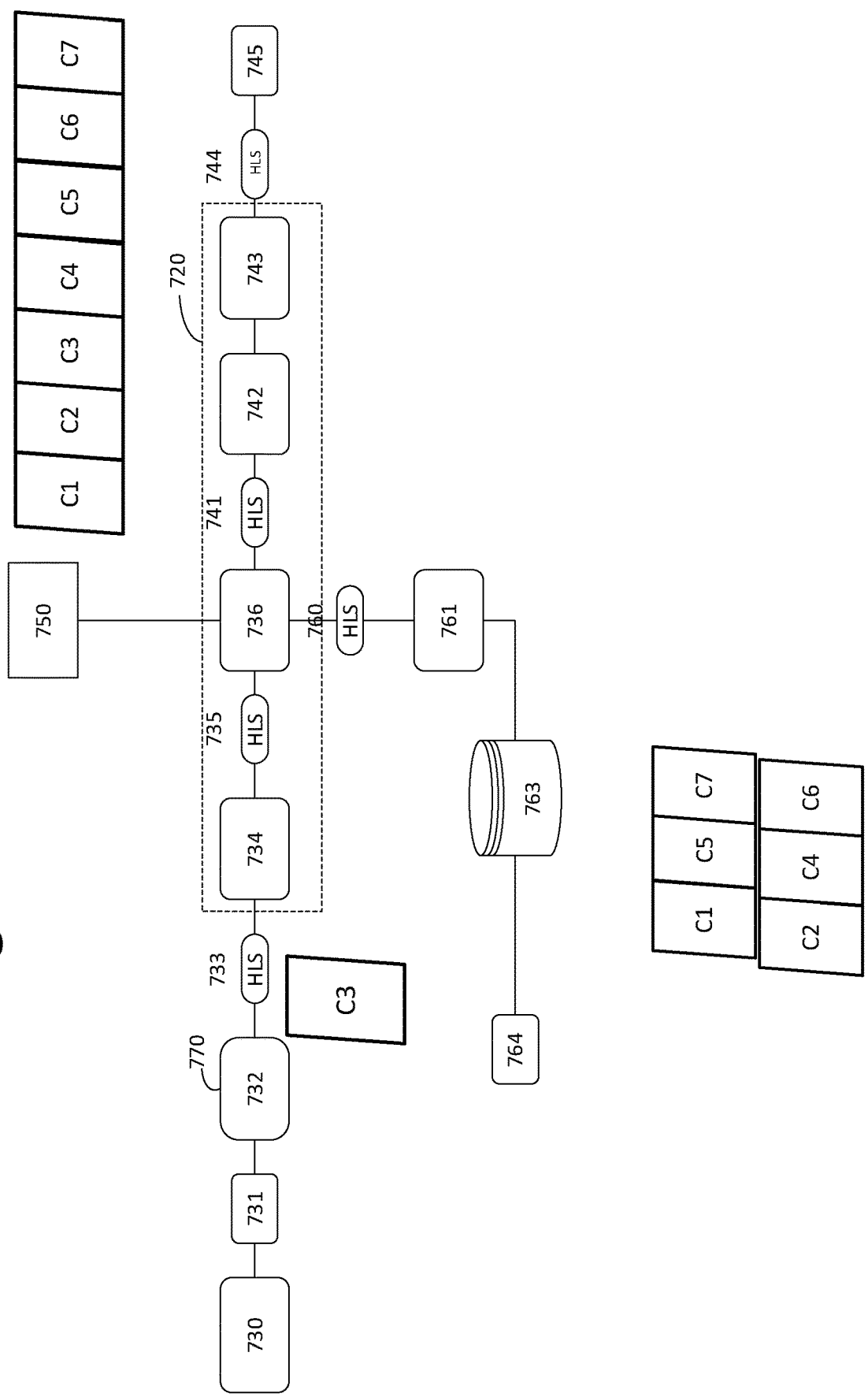
FIG. 8 is a block diagram of a system according to an embodiment of the invention.

With reference to FIG. 8, a system according to a further embodiment of the present invention is now illustrated. In figure, a device 736 is illustrated representing an example of the device 200 above, a source 731 of live contents (C2) and a source 763 of VOD contents (for example, C2, C4, C6: advertisement; C1, C5, C7: VOD program, such as a film or recorded transmission). A playout 730, a live decoder 732 and an off-line encoder 764 can be moreover present. The output signal from the live decoder 732 is a frame flow and can be sent to a traditional transmission means like DTT (digital terrestrial), satellite, etc. The encoder 732 is also able to segment the compressed flow so as to obtain a reproduction list like for example in FIG. 3 or 7 (bearing in mind that this list will not be closed because it is a live event). Accordingly at 733, the segments of the live content C3 and an open list with reference to these segments in the HLS format will be present. These segments and the corresponding list of the live content C2 are stored in a temporary server 734. On the VOD branch, an encoder 764 compresses offline the contents C1, C2, C4-C7, which are stored in the repository or source 763. The device 736, which we could also call in the example the OTT VOD-linear converter, retrieves lists on the live or VOD branch according to programming schedule information provided by a controller 750 (that could be made from a multiplicity of devices, and could also interact with other parts of the system illustrated in FIG. 8). In the example, the programming schedule of the linear channel provides this succession of contents: C1 (VOD1), C2 (ADV1), C3 (LIVE), C4 (ADV2), C5 (VOD2), C6 (ADV3D), C7 (VOD3). ADV stands for advertisement, and in the example it can also be compressed offline. In order to reproduce content C1, the device 736 will obtain, for example in response to a http get request, a list from the server 763, and on the basis of this list it will make up a streaming linear channel distribution list as explained above with reference to list LLOTT. When near reaching the last segment of the content C1, the device 736 will always obtain from the server 763 a list of segments of the offline content C2, and will insert inside the streaming channel list the first content segment C2 immediately after the last segment of the content C1. When near reaching the last segment of the content C2, the device 736 will start to retrieve a list relating to the live content C3; in the instant in which this content has to be transmitted the first segment corresponding to this instant will be inserted into the streaming linear channel list immediately after the last segment of the content C2. It is clear that the switch between content C2 and C3 can be controlled and varied, for example by choosing a segment that is not necessarily the last of the content C2; similarly, it is possible to decide in which instant to transmit the live content C3 by choosing a corresponding segment. When near reaching the last segment of the content C3, the device 736 will always obtain from the server 763 a list of segments of the offline content C4, and will insert inside the streaming channel list the first segment of the content C4 immediately after the last segment of the content C3. Also here it is possible to decide dynamically for the switch (also in the case of a change from C1 to C2). The procedure thus continues for the other contents of the programming schedule. It is pointed out that each of the contents C1, C2, C4-C7 can be obtained by offline compression with the same parameters or each with different parameters.

In FIG. 8, the unit 736 constitutes an example of a content supplying entity. In another example, the content supplying entity comprises also at least one or more between: the playout unit 730 (that can be omitted or replaced by a storage unit of content reproduction sequences), the repository 763, the controller 750, the server 732, and/or optionally one or other elements of the composition chain of the linear channel as illustrated in FIG. 8.

The above shows how it is possible to make a streaming linear channel from a multiplicity of formats (different live formats, different offline formats, a combination thereof) through simple operations on the lists that—being operations substantially on strings—require very low calculation powers. Further, it is possible to affect at minimum or nil the live distribution and composition distribution chain by "traditional" transmission means (DTT, satellite, etc.), thus avoiding introducing risks to the transmission quality of the distribution chain.

One of the other advantages of the invention is that of not having to always keep the live encoder active (especially when also recorded content is present), which can thus be used only when necessary, thus reducing energy consumption or contributing to saving resources, for example if the encoder is shared with other channels. Further, when the recorded contents are compressed offline, the space for storing the recorded contents can be reduced whilst maintaining high quality of the compressed content and it becomes possible to achieve a band saving that is not possible with the known systems described in FIGS. 1a and 1b. Further, again thanks to the invention, it is possible to reduce the use of or replace the use of the playout, thus contributing to further simplifying the system.

Further, if the discontinuity indicator is used, for example to inform the receiver of the change of content/program from programming schedule in the switch from one segment to the subsequent segment, reception is facilitated on the receiver side, avoiding jumps or unwanted black frames and thus improving reception quality.

In the examples, the HLS protocol was used only for illustrative purposes; nevertheless, the same considerations apply also in the case of other protocols such as DASH, Smooth Streaming, etc. or a combination thereof.

Many of the embodiments and examples have been disclosed with reference to steps of methods or processes. However, the description provided can also be implemented in a program to be run on a processing device (including distributed processing) or in a device having suitably configured means. What has been disclosed for devices applies also to a respective method or to respective methods. As illustrated above, the device can be implemented in only one apparatus, via HW/SW or combination thereof, or on multiple units or interconnected apparatuses (which are also HW, SW or a combination thereof). Further, features like interface units, processing units, transmission units, etc. can be replaced, respectively, by corresponding interface means, processing means, transmission means, etc. Naturally, the description set forth herein above concerning embodiments and examples that apply the principles recognized by the inventors is provided solely by way of example of these principles and therefore it should not be understood as a limitation of the scope of the invention claimed herein.

The invention claimed is:

1. Method for composing a streaming linear channel to be transmitted on the basis of audiovisual segments to be reproduced in succession, the streaming linear channel comprising at least a first audiovisual content obtained from a first source, and a second audiovisual content obtained from a second source, the method comprising the steps of:

obtaining a first content segment identifier which identifies a first audiovisual segment related to the first content, the first content comprising a first program;

obtaining a second content segment identifier which identifies a second audiovisual segment related to the second content, the second content comprising a second program, wherein the first audiovisual content and the second audiovisual content are different contents to be reproduced according to a predetermined succession sequence, where at least one between the first content segment identifier and the second content segment identifier is included in a first-content reproduction list and, respectively, in a second-content reproduction list containing audiovisual segments to be reproduced according to a succession defined for said first content and, respectively, second content;

generating a streaming linear channel reproduction list, said list comprising a first streaming linear channel segment identifier and a second streaming linear channel segment identifier each identifying, respectively, a first and a second streaming linear channel segment and obtained on the basis of, respectively, the first content segment identifier and the second content segment identifier, and in which the streaming linear channel reproduction list specifies that the second streaming linear channel segment is to be reproduced in succession immediately after the first streaming linear channel segment, wherein:

the first content segment identifier is included in the first-content reproduction list and is a final segment identifier for the first content which identifies a final audiovisual segment related to the first content;

the second content segment identifier is included in the second-content reproduction list and is an initial content segment identifier for the second content which identifies an initial audiovisual segment related to the second content; and the streaming linear channel reproduction list lists the final segment identifier for the first content prior to the initial content segment identifier for the second content and specifies that the final audiovisual segment related to the first content is to be reproduced prior to the initial audiovisual segment related to the second content, wherein generating the streaming linear channel reproduction list comprises:

generating the streaming linear channel reproduction list with at least one content segment identifier included in the first-content reproduction list or the second-content reproduction list omitted from the streaming linear channel reproduction list.

2. Method according to claim 1, in which at least one between the first-content reproduction list and the second-content reproduction list is obtained in advance and independently of a streaming linear channel programming.

3. Method according to claim 1, in which information contained in each segment corresponding to the first and second streaming linear channel segment identifier is same information contained in the first segment relating to the first content and, respectively, to the second segment relating to the second content.

4. Method according to claim 1, where the first content refers to live content, and the second content refers to offline content obtained by compressing without time constraints.

5. Method according to claim 1, in which amongst the first linear channel segment identifier and the second linear channel segment identifier there is inserted, in the streaming linear channel reproduction list, an indicator of discontinuity of content that identifies a discontinuity between information included in the first segment of content and information included in the second segment of content.

6. Method according to claim 5, wherein the indicator of discontinuity indicates an update for at least one decoding parameter at a user terminal configured to receive the streaming linear channel reproduction list.

7. Method according to claim 5, wherein the indicator of discontinuity indicates, to a user terminal configured to receive the streaming linear channel reproduction list, a program change.

8. Method according to claim 1, wherein at least one audiovisual content of the streaming linear channel is an advertisement or a gap between programs, and at least another one audiovisual content of the streaming linear channel is not an advertisement or a gap between programs.

9. Method according to claim 1, wherein the at least one content segment identifier omitted from the streaming linear channel reproduction list corresponds to a closing portion of the first program or an opening portion of the second program.

10. Method according to claim 1, further comprising selecting the at least one content segment identifier to omit from the streaming linear channel reproduction list based on at least one programming parameter.

11. Device for composing a streaming linear channel to be transmitted on the basis of audiovisual segments to be reproduced in succession, the streaming linear channel comprising at least a first audiovisual content obtained from a first source, and a second audiovisual content obtained from a second source, the device comprising:
an interface configured to obtain a first content segment identifier which identifies a first audiovisual segment related to the first content;
wherein the interface is also configured to obtain a second content segment identifier that identifies a second audiovisual segment related to the second content, wherein the first audiovisual content and the second audiovisual content are different contents to be reproduced according to a predetermined succession sequence, wherein at least one of the first content segment identifier and the second content segment identifier are included in a reproduction list of first content and, respectively, in a reproduction list of second content containing audiovisual segments to be reproduced according to a succession defined for said first content and, respectively, second content;
a processor configured to generate a streaming linear channel reproduction list configured for reproducing at least a first program and a second program, said streaming linear channel reproduction list comprising a first streaming linear channel segment identifier and a second streaming linear channel segment identifier each identifying, respectively, a first and second streaming linear channel audio-visual segment obtained on the basis of, respectively, the first content segment identifier and the second content segment identifier, and in which the streaming linear channel reproduction list specifies that the second streaming linear channel segment is to be reproduced in succession immediately after the first streaming linear channel segment, wherein:
the first content segment identifier is included in the reproduction list of first content and is a final segment identifier for the first content which identifies a final audiovisual segment related to the first content;
the second content segment identifier is included in the reproduction list of second content and is an initial content segment identifier for the second content which identifies an initial audiovisual segment related to the second content; and
the streaming linear channel reproduction list lists the final segment identifier for the first content prior to the initial content segment identifier for the second content and specifies that the final audiovisual segment related to the first content is to be reproduced prior to the initial audiovisual segment related to the second content,
wherein generating the streaming linear channel reproduction list comprises:
generating the streaming linear channel reproduction list with at least one content segment identifier included in the reproduction list of first content or the reproduction list of second content omitted from the streaming linear channel reproduction list.

12. System for composing a streaming linear channel to be transmitted on the basis of audiovisual segments to be reproduced in succession, the system comprising a device for composing a streaming linear channel according to claim 11, and one or more user terminals configured to receive the streaming linear channel reproduction list from the device to compose a streaming linear channel.

13. At least one non-transitory computer-readable storage medium having stored thereon a computer program that includes instructions configured to perform, when the computer program is run on a computer, the method of claim 1.

14. Device for reproducing a streaming linear channel transmitted on the basis of audiovisual segments to be reproduced in succession, the streaming linear channel comprising at least a first audiovisual content obtained from a first source, and a second audiovisual content obtained from a second source, the device comprising:
a receiver configured to receive a streaming linear channel reproduction list, said list comprising a first streaming linear channel segment identifier and a second streaming linear channel segment identifier each identifying, respectively, a first and a second audiovisual segment of a streaming linear channel and obtained on the basis of, respectively, a first content segment identifier and a second content segment identifier,
in which the first content segment identifier and the second content segment identifier belong to a first content reproduction list and, respectively, to a second content reproduction list containing audiovisual segments to be reproduced according to a succession defined for said first content, the first content comprising a first program, and, respectively, second content, the second content comprising a second program, wherein the first audiovisual content and the second audiovisual content are different contents to be reproduced according to a predetermined succession sequence, wherein:

the first content segment identifier is included in the first content reproduction list and is a final segment identifier for the first content which identifies a final audiovisual segment related to the first content;

the second content segment identifier is included in the second content reproduction list and is an initial content segment identifier for the second content which identifies an initial audiovisual segment related to the second content; and the streaming linear channel reproduction list lists the final segment identifier for the first content prior to the initial content segment identifier for the second content and specifies that the final audiovisual segment related to the first content is to be reproduced prior to the initial audiovisual segment related to the second content, wherein the streaming linear channel reproduction list is generated with at least one content segment identifier included in the first content reproduction list or the second content reproduction list omitted from the streaming linear channel reproduction list.

15. Device according to claim 14, in which the receiver is also configured to receive a content discontinuity indicator indicating a discontinuity between:

information included in the first segment of the streaming linear channel and related to the first content, and information included in the second segment of the streaming linear channel and referring to the second content.

* * * * *